United States Patent [19]

Hanaoka

[11] Patent Number: 4,563,748
[45] Date of Patent: Jan. 7, 1986

[54] TEMPERATURE MEASURING SYSTEM

[75] Inventor: Tadashi Hanaoka, Tanashi, Japan

[73] Assignee: Citizen Watch Company Limited, Tokyo, Japan

[21] Appl. No.: 435,574

[22] Filed: Oct. 19, 1982

[30] Foreign Application Priority Data

Oct. 20, 1981 [JP] Japan .................. 56-167533
Oct. 20, 1981 [JP] Japan .................. 56-167534

[51] Int. Cl.[4] .................... G01K 7/00; F23N 5/20
[52] U.S. Cl. ........................... 364/557; 236/46 R
[58] Field of Search ............ 364/557, 514, 571, 577, 364/580; 236/46 R; 368/200, 201, 202

[56] References Cited

U.S. PATENT DOCUMENTS

| | | | |
|---|---|---|---|
| 3,978,325 | 8/1976 | Goldstein et al. | 364/415 |
| 4,031,365 | 6/1977 | Raggiotti et al. | 364/557 |
| 4,068,526 | 1/1978 | Goldstein | 364/557 |
| 4,199,677 | 4/1980 | Vanderpool | 235/463 |
| 4,206,872 | 6/1980 | Levine | 236/46 R |
| 4,314,665 | 2/1982 | Levine | 165/12 |
| 4,362,995 | 12/1982 | Morris | 328/144 |
| 4,398,261 | 8/1983 | Saint-Oyant et al. | 364/571 |

Primary Examiner—Errol A. Krass
Assistant Examiner—Heather R. Herndon
Attorney, Agent, or Firm—Jordan and Hamburg

[57] ABSTRACT

A temperature measuring system which includes a CR oscillator circuit and a logarithmic transformation circuit. The CR oscillator circuit employs at least a thermistor as the resistance element for forming a time constant with a capacitor which serves as the capacitance element, the oscillation frequency of the oscillator circuit varying with a change in ambient temperature. The logarithmic transformation circuit subjects the information obtained from the CR oscillator circuit to a logarithmic transformation, whereby said information is logarithmically compressed to provide numerical data approximately dependent upon ambient temperature.

9 Claims, 19 Drawing Figures

TEMPERATURE MEASURING SYSTEM

BACKGROUND OF THE INVENTION

This invention relates to improvements in a temperature measuring system having temperature sensing means of the type which performs a temperature-to-frequency or temperature-to-period conversion through use of a CR oscillator circuit wherein a thermistor is included in the resistance for forming the CR-time constant, the oscillation frequency of the oscillator circuit varying with a change in ambient temperature. The invention relates also to a temperature compensating system, used in an electronic timepiece, whereby a time base signal produced by crystal-controlled oscillator circuit is subjected to temperature compensation on the basis of temperature data acquired from the improved temperature measuring system.

A well-known method of sensing a change in ambient temperature relies upon a CR oscillator (namely an oscillator which includes capacitance and resistance elements forming a time constant) in which a thermistor forms all or a part of the oscillator time-constant resistance. The arrangement is such that the change in temperature is sensed on the basis of a change in the oscillation frequency of the CR oscillator, caused by a variation in the thermistor resistance. This method has found wide application in a variety of digital measuring instruments since it is the most simple means of digitally quantifying analog environmental temperature information. However, since the magnitude of the thermistor resistance varies exponentially with respect to a change in temperature, as will be described in further detail below, the oscillation frequency and period of the CR oscillator also are exponential functions of the temperature, so that temperature data which varies linearly with respect to temperature cannot be obtained. This leads to a number of difficulties. For example, temperature data in the form of an exponential function cannot be utilized directly to provide a visual display of temperature. Moreover, in electronic devices of the type in which temperature compensation is essential, problems are experienced in compensating for a temperature-induced error term which varies proportionally with respect to temperature.

A further difficulty is that a very large difference develops between the oscillation frequency at low temperature and the oscillation frequency at high temperature when temperature is measured over a broad range of values or when, based upon such a temperature measurement, compensation is effected over a greater range in an electronic device such as an electronic timepiece. This necessitates a large amount of counter circuitry for the analog-to-digital conversion. To improve upon these defects, it has been proposed to combine the thermistor with a number of series- and parallel-connected resistors so that the change in the combined resistance will be approximately proportional to the change in temperature over a certain temperature range, or so that the change in combined resistance may be expressed as a specific function. However, the temperature characteristics of the combined resistance expressed in this fashion are all approximate characteristics, and there are many functions which are impossible to realize. Another disadvantage is that the combined resistors are large in number and must have resistance values that are highly accurate, thereby raising the cost of the temperature measuring device by a wide margin.

SUMMARY OF THE INVENTION

The present invention seeks to eliminate the above-mentioned shortcomings encountered in the prior art by providing a temperature measuring system which is extremely convenient for practical applications, as well as a temperature compensating system which utilizes the temperature measuring device in an electronic timepiece.

Accordingly, an object of the present invention is to provide a temperature measuring system in which temperature data which is approximately proportional to a linear expression of ambient temperature is obtained by a logarithmic transformation of information produced by a CR oscillator circuit including a thermistor as the resistance element for forming the CR-time constant.

Another object of the present invention is to provide a temperature measuring system in which specific temperature function data of any functional expression, wherein temperature is a variable, is obtained on the basis of acquired temperature data which varies approximately linearly with ambient temperature.

Still another object of the present invention is to provide a temperature compensating system for an electronic timepiece, constituted by the temperature measuring device so adapted as to provide temperature compensation data for a crystal vibrator whose frequency of oscillation varies with ambient temperature, wherein the timebase signal produced by the crystal-controlled oscillator circuit is subjected to temperature compensation on the basis of the temperature compensation data.

The thermister referred to hereinafter is taken to mean an NTC (negative temperature coefficient) thermistor, namely one which exhibits reduced resistance with increase of temperature, comprising a solid solution such as $Fe_3O_3$, $MgCr_2O_4$ or $MgAl_2O_4$, or a composite sintered body of a transition metal oxide, such as $NiO$, $Mn_2O_3$, $Co_2O_3$, etc.

A thermistor employed as a temperature sensor exhibits outstanding characteristics. It is small in size, highly sensitive, and the resistance value thereof can be set quite freely. It also lends itself well to mass-production and is therefore attractive economically. Since the sintered body is polycrystalline, however, some problems are encountered in terms of industrial reproducibility when compared to thermocouples or like devices. The relation between temperature T (Kelvin) and the resistance R of the thermistor expressed by the following equation:

$$R = R_O \cdot exp\ (B/T - B/T_o) \tag{1}$$

where $R_o$ represents the resistance (referred to hereinafter as the reference resistance) of the thermistor at a reference temperature $T_o$ (Kelvin). B is a constant referred to as the thermister constant. While the reference resistance $R_o$ and the thermistor constant B are important constants indicative of the thermistor characteristics, errors are likely to occur in these constants due to manufacturing variations. Any error in $R_o$ and B will give rise to an error in measured results when the temperature T is calculated from Eq. (1) by measuring the thermistor resistance R. If we let $\Delta R_o$ and $\Delta B$ represent the errors in the reference resistance $R_o$ and thermistor constant B, respectively, then the temperature measurement error $\Delta T$ at a temperature T will be given by:

$$\Delta T = T/B \cdot \Delta R_o + (T_o - T)/T_o \cdot \Delta B \qquad (2)$$

The first term on the right side of Eq. (2) indicates the error attributed to the reference resistance $R_o$, while the second term on the right side indicates the error attributed to the thermistor constant B.

If we assume that the error $\Delta R_o$ in the reference resistance $R_o$ for a reference temperature $T_o$ of 25° C. is $\pm 5\%$ and that the error $\Delta B$ in the thermistor constant B is $-2\%$, then the temperature measurement error $\Delta T$ can be found from Table I. It should be noted that the thermistor constant B in this case is 4000K.

TABLE I

| Temperature T | | Temperature Measurement Error $\Delta T$ °C. | |
|---|---|---|---|
| °C. | °K. | Attributed to $R_o$ | Attributed to B |
| −20 | 253 | ±0.80 | ±0.76 |
| −10 | 263 | ±0.86 | ±0.62 |
| 0 | 273 | ±0.93 | ±0.46 |
| 10 | 283 | ±1.00 | ±0.28 |
| 20 | 293 | ±1.07 | ±0.10 |
| 30 | 303 | ±1.15 | ±0.10 |
| 40 | 313 | ±1.22 | ±0.32 |
| 50 | 323 | ±1.30 | ±0.54 |
| 60 | 333 | ±1.39 | ±0.78 |
| 70 | 343 | ±1.47 | ±1.03 |

It will appreciated from Table I that the temperature measurement error $\Delta T$ is of significant magnitude, ranging from $\pm 0.8°$ C. to $\pm 1.47°$ C., for the case where the error $\Delta R_o$ in the reference temperature $R_o$ is $\pm 5\%$. It is essential, therefore, to correct for the reference resistance $R_o$ when designing a temperature measuring device. Such a correction can be effected with relative ease, as will be described later.

As for the error $\Delta B$ of $\pm 2\%$ in the thermister constant B, it will be seen that temperature measurement error $\Delta T$ increases geometrically as the temperature departs from the reference temperature $T_o$, and that the error $\Delta T$ is no less than about $\pm 0.5°$ C. below 0° C. and above 50° C. It follows then that a correction must be made for the thermistor constant B. In order to determine B, however, the variation in thermistor resistance must be measured while subjecting the thermistor to a very accurate temperature change. This is a very troublesome procedure and does not constitute a helpful expedient for correcting the error. Rather than attempting to correct the error $\Delta B$ in the thermistor constant B, it is far more economical to select and use a thermistor having a small error $\Delta B$ from the start. For example, if a thermistor can be found with an error $\Delta B$ of $\pm 1\%$, then the temperature measurement error $\Delta T$ attributed to the thermistor constant B can be reduced to $\pm 0.5\%$ or less within a temperature range of from $-40°$ C. to 70° C. Thermistors meeting the above qualification are readily available.

The foregoing is a review of temperature measurement accuracy when using a thermistor as a temperature sensor, and forms the basis for a fuller understanding of the invention.

In accordance with the present invention, the aforementioned objects are attained by providing a temperature measuring system which includes a CR oscillator circuit and a logarithmic transformation circuit. The CR oscillator circuit employs a thermistor as at least a part of the resistance element for forming a time constant with a capacitor which serves as the capacitance element, the oscillation frequency of the oscillator circuit varying with a change in ambient temperature. The logarithmic transformation circuit subjects the information obtained from the CR oscillator circuit to a logarithmic transformation, whereby said information is logarithmically compressed to provide numerical data approximately dependent upon ambient temperature.

In another embodiment of the present invention, there is provided a temperature compensating system which comprises, in addition to the aforementioned CR oscillator circuit and logarithmic transformation circuit, a crystal-controlled oscillator circuit for producing a time base signal and having a crystal vibrator the frequency whereof varies with a change in ambient temperature, a time keeping accuracy adjustment circuit which receives the time base signal from the crystal-controlled oscillator circuit for adjusting the time-keeping accuracy of the signal, and a read-only memory for storing temperature compensation data relating to the crystal vibrator, which data is given as a function of ambient temperature. Output information from the CR oscillator circuit is logarithmically compressed by the logarithmic transformation circuit to provide numerical data approximately dependent upon ambient temperature, and the numerical data is used to address the read-only memory. The latter responds by delivering the temperature compensation data to adjustment input terminals of the time-keeping accuracy adjustment circuit, which in turn provides a temperature-compensated time signal.

The specific nature of the invention, as well as other objects, uses and advantages thereof, will clearly appear from the description and from the accompanying drawings, in which line reference characters refer to like or corresponding parts.

DESCRIPTION OF THE PREFERRED EMBODIMENTS

Figure 1:
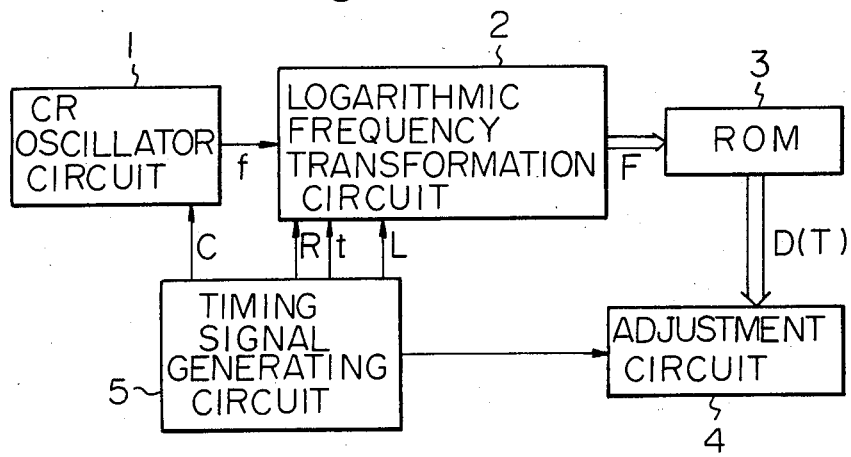
FIG. 1 is a block wiring diagram of a temperature compensating system for an electronic timepiece, illustrating the general construction of a first embodiment of the present invention.

As shown in FIG. 1, the invention comprises a CR oscillator circuit 1 which has a thermistor as the resistance element for forming the time constant, and whose oscillation frequency varies with changes in ambient temperature, as well as a logarithmic frequency transformation circuit 2 for producing a logarithmic frequency F by computing the logarithm of the frequency f of the signal produced by the CR oscillator circuit 1. The logarithmic frequency transformation circuit 2 counts the pulses in the pulse train obtained from the CR oscillator circuit 1, which pulse train has a frequency f that varies with temperature, and generates the log of the counted number to produce numerical data, namely the logarithmic frequency F. This data is employed as the address input to a read-only memory 3. It should be noted that, in accordance with this embodiment of the invention, the circuit arrangement comprising CR oscillator circuit 1 and logarithmic frequency transformation circuit 2, alone or in combination with the read only memory 3, constitute a temperature measuring system.

Any change in ambient temperature will cause a different address to be applied to the read-only memory 3, from the output side whereof the addressed numerical data D(T) will be delivered having a specific functional relationship dependent upon the temperature. The numerical data D(T) acquired from the read-only memory 3 is applied to an adjustment circuit 4 for varying the condition of the device undergoing the temperature compensation. In other words, the adjustment circuit 4 assures that the device will be temperature-compensated in accordance with the particular objective. In this embodiment, a circuit arrangement including CR oscillator circuit 1, logarithmic frequency transformation circuit 2, read-only memory 3 and adjustment circuit 4 constitute a temperature compensating system in accordance with the invention.

There is provided a timing signal generating circuit 5 under the control of which the CR oscillator circuit 1, logarithmic frequency transformation circuit 2 and adjustment circuit 4 operate in accordance with a predetermined sequence. To this end, the timing signal generating circuit 5 produces a signal which serves as an accurate time base, particularly for the logarithmic frequency transformation circuit 2.

In the above arrangement, the output signal of the CR oscillator circuit 1 has a frequency f expressed by the following formula:

$$f = k/CR \quad (3)$$

where R is the magnitude of the time-constant resistance, C is the magnitude of the time constant capacitance, and k is a constant. If the time constant resistance consists solely of the thermistor, then substituting R from Eq. (1) into Eq. (3) will give us:

$$f = k/[CR_o \cdot \exp(B/T - B - T_o)] \quad (4)$$

$$= [k/CR_o] \cdot e^{B/T_o} \cdot e^{-B/T}$$

$$= Ae^{-B/T}$$

where A is as expressed by the following:

$$A = k\, C\, R_o e^{-B/T_o} \quad (5)$$

Figure 2:
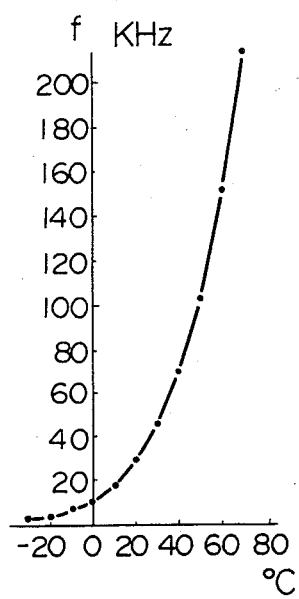
FIGS. 2 and 3 are graphs showing the relationship between ambient temperature and the frequency of a CR oscillator circuit containing a thermister.

If the reference resistance $R_o$ is one megohm, the capacitance C is 20 picofarads, the reference temperature $T_o$ is 25° C. (=298° K.), the thermistor constant B is 4000K, and k is 1.39, then the value of A will be approximately $4.12 \times 10^{-11}$. Under these conditions, the output signal frequency f of the CR oscillator circuit 1 rises sharply as the temperature T rises, as depicted by the graph of FIG. 2. The temperature T, frequency f and logarithmic frequency F are related in the manner shown in Table II below.

TABLE II

| Temperature T | | Frequency | Logarithmic Frequency |
|---|---|---|---|
| °C. | °K. | f (kHz) | F (HZ) |
| −20 | 253 | 3.307 | 3.519 |
| −19 | 254 | 3.519 | 3.546 |
| −10 | 263 | 6.033 | 3.781 |
| 0 | 273 | 10.531 | 4.022 |
| 10 | 283 | 17.673 | 4.247 |
| 20 | 293 | 28.630 | 4.457 |
| 30 | 303 | 44.926 | 4.652 |
| 40 | 313 | 68.497 | 4.836 |
| 50 | 323 | 101.742 | 5.007 |
| 60 | 333 | 147.573 | 5.169 |
| 69 | 342 | 202.438 | 5.306 |
| 70 | 343 | 209.459 | 5.321 |

In the present example, a one-degree variation (C) in the temperature T from −20° C. to −19° C. causes a change of about 0.21 kilohertz in the frequency f. If this 0.21 kilohertz change is adopted as a unit, then the difference between the frequency at 70° C. and at −20° C. will be approximately 971. Since expressing such a figure as a binary number would require 10 bits, expressing temperature over the range of from 70° C. to −20° C. at one-degree (C) increments would result in considerable redundancy. To curtail such redundancy, the frequency f need only be subjected to a logarithmic transformation to express it as the logarithmic frequency F. Taking the log of Eq. (4) will give us F, as follows:

$$F = \log f = \log A - (B/T) \log e \quad (6)$$

Figure 3:
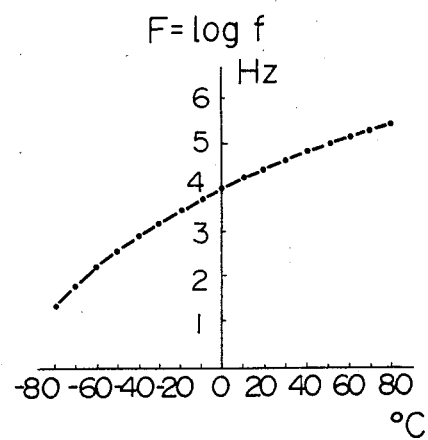

The graph of Eq. (6) is a hyperbola, as depicted in FIG. 3, wherein it will be appreciated that the curve approximates a straight line for a temperature T of greater than −20° C. (253° K.) and less than 70° C. (343° K.). It will be seen that the slope of the curve is slight in the high-temperature region. Thus, for a one-degree variation (C) in the temperature T from 69° C. to 70° C., the change in the logarithmic frequency F will be about 0.015 hertz. Using this value as the unit of measurement, the difference between the logarithmic period at 70° C. and at −20° C. will be approximately 122. This is a value which can be expressed by only seven binary bits, so that redundancy is curtailed as desired. By logarithmically compressing the frequency F of the signal from the CR oscillator circuit 1 in this manner, the resulting data is shortened by three bits, and the number of addresses required for the read-only memory 3 is reduced to ⅛ of that originally required. This makes it possible to achieve a major reduction in the capacity of the memory 3. Furthermore, since the change in the logarithmic frequency F may be considered to be substantially linear within a certain range of temperatures, as mentioned above, the arrangement of the invention when applied to a simple thermometer allows the measured value obtained at the output of the logarithmic frequency transformation circuit 2 to be employed directly as temperature data approximately proportional to the ambient temperature, without requiring a functional conversion using the read-only memory 3.

The foregoing describes the principle of the invention based on the block diagram of FIG. 1. The elements constituting the arrangement of FIG. 1 will now be described in more concrete form with reference to detailed circuitry.

Figure 4:
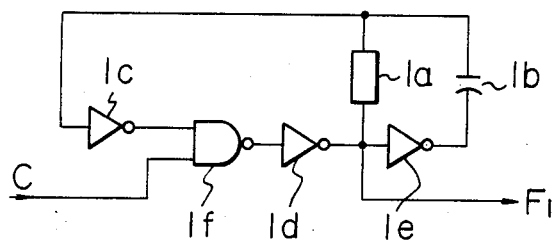
FIG. 4 is a circuit diagram illustrating a CR oscillator circuit.

FIG. 4 is a circuit diagram exemplifying specific circuitry for realizing the CR oscillator circuit 1 using a thermister as the time-constant resistor. The CR oscillator circuit includes a thermister 1a, serving as the time-constant resistor, and a capacitor 1b, serving as the time-constant capacitor. The circuit also includes C-MOS inverters 1c, 1d, 1e, and a C-MOS AND gate 1f. The output of the inverter 1c is connected to one input terminal of the NAND gate 1f, whose output is in turn connected to the input of the inverter 1d. The output of the inverter 1d is connected to the input of inverter 1e. The latter has its output connected to the input of inverter 1c through the capacitor 1b. The thermister 1a is connected between the output of inverter 1d and the input of inverter 1c. The other input terminal to NAND gate 1f receives an oscillation control signal C from the externally located timing signal generating circuit 5.

The CR oscillator circuit 1 having the foregoing construction is set into oscillation when the oscillation control signal C goes to logical "1" to produce an output signal designated as F1. The oscillating circuit output is a square wave signal obtained from the output of inverter 1d and having a frequency f, as expressed by Eq. (3). The constant k in this case is 0.72. As described earlier, the thermister 1d will introduce an error, and there will also be some error in the capacitance of capacitor 1b. It is therefore necessary to correct for these errors. Basically, one approach is to vary the capacitance of capacitor 1b so as to set the product of R and C in Eq. (3) to a predetermined values. This can be achieved by using a trimmer capacitor as capacitor 1b, or by combining a plurality of capacitors to provide the optimum capacitance. Another approach is to provide a frequency divider circuit for dividing the output signal frequency f of the oscillator circuit 1, and then set the dividing ratio of the frequency divider to a suitable value. In this case, the constant k in Eq. (3) will be given by the following:

$$k = 0.72/h \qquad (7)$$

where h is the set dividing ratio. A frequency divider circuit having a variable dividing ratio can be readily attained by properly interconnecting a down-counter of the type which counts down the number of pulses in an input pulse train from a preset value, a zero-sensing circuit for sensing that the down-counter has reached a count of zero, and a circuit for presetting the down-counter to the input numerical value designated as the dividing ratio, at such time that the sensing circuit senses the value zero. An even more convenient frequency divider circuit having a variable dividing ratio can be realized through application of a rate multiplier, as will be described later.

Figure 5:
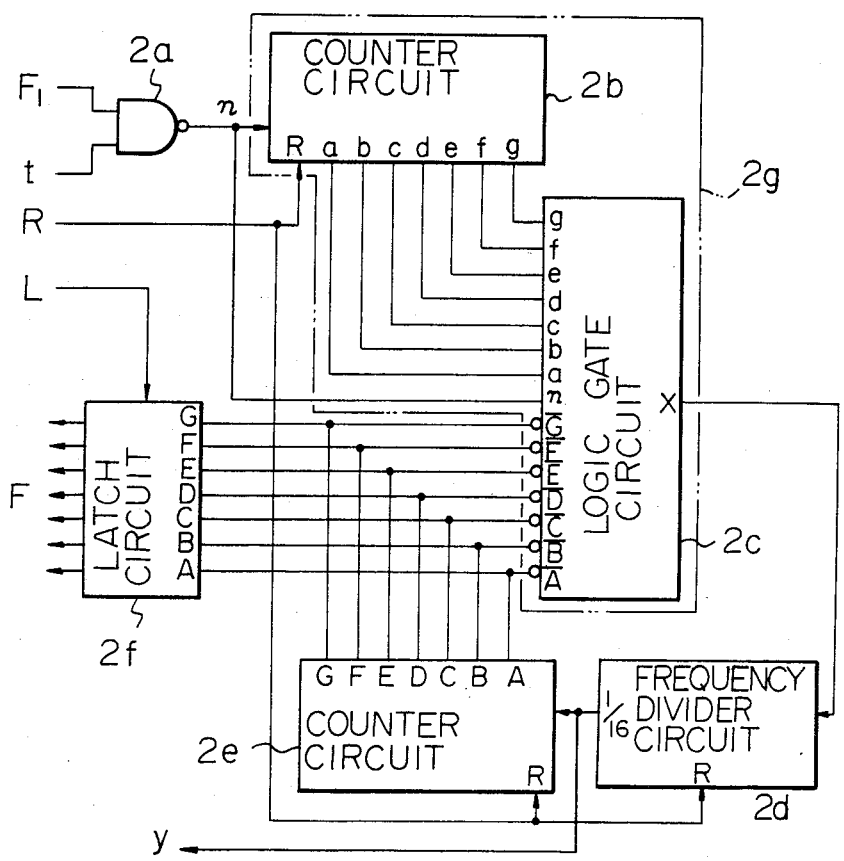
FIG. 5 in a circuit diagram illustrating a logarithmic frequency measurement circuit included in the arrangement of FIG. 1.

FIG. 5 illustrates a specific example of the logarithmic frequency transformation circuit 2 for transforming the output from the CR oscillator circuit 1 of FIG. 1 into the logarithmic frequency F directly, or after the frequency of the output signal has been corrected by means of a suitable frequency division. The logarithmic frequency transformation circuit 2 periodically receives groups of pulses of signal F1, designated as n, which are transferred under the control of a gating circuit 2a composed of a two-input NAND gate. Logarithmic frequency transformation circuit 2 comprises a first counter 2b which is a seven-bit binary counter, a logic gate circuit 2c, a frequency divider 2d having a dividing ratio of 16, a second counter 2e which is a seven-bit binary counter, and a latch circuit 2f. The circuit composed of the first counter 2b and logic gate circuit 2c enclosed by the phantom lines is generally referred to as a rate multiplier, and will be designated 2g.

The logic gate circuit 2c produces an output signal x given by the logical expression shown below. It should first be noted that the output signals a, b, c, d, e, f and g from the first counter 2b are bit signals of a binary number, having the respective weights $2^0$, $2^1$, $2^2$, $2^3$, $2^4$, $2^5$ and $2^6$. Thus, x is written:

$$x = n(\overline{aG} + \overline{abF} + \overline{abcE} + \overline{abcdD} + \overline{abcdeC} + \overline{abcdefB} + \overline{abcdefgA}) \qquad (8)$$

Eq. (8) means that when logical inputs "1" or "0" are impressed upon the rate input terminals $\overline{A}$, $\overline{B}$, $\overline{C}$, $\overline{D}$, $\overline{E}$, $\overline{F}$ and $\overline{G}$ of the rate multiplier 2g, the number X of pulses in the output signal x will be related to the number P of input pulses in the input pulse signal n by the following expression:

$$X = P/2^7 \times (2^6\overline{G} + 2^5\overline{F} + 2^4\overline{E} + 2^3\overline{D} + 2^2\overline{C} + 2^1\overline{B} + 2^0\overline{A}) \qquad (9)$$

In other words, the signal x generated by the logic gate circuit 2c is a pulse train consisting of a number of pulses proportional to the binary number set at the rate input terminals $\overline{A}$ through $\overline{G}$. With the construction and function of the rate multiplier 2g as background, the operation of the logarithmic frequency transformation circuit shown in FIG. 5 will be discussed.

The signal whose frequency is to be measured is designated F1 in FIG. 5. The signal F1 is applied to one input terminal of the gating circuit 2a, whose other input terminal receives a signal t of highly precise duration, produced by the timing signal generating circuit 5. The signal t acts as a gating signal for opening and closing the gating circuit 2a. The output of the gating circuit 2a is the pulsed signal n input to the rate multiplier 2g, the signal being applied to the count input terminal of the first counter 2b, and to the logic gate 2c. The output signal x of the rate multiplier 2g is applied to the count input terminal of the second counter 2e through the frequency divider circuit 2d, the dividing ratio whereof is 1/16.

The second counter 2e produces output signals A, B, C, D, E, F and G, which are bit signals of a binary number, having weights of $2^0$, $2^1$, $2^2$, $2^3$, $2^4$, $2^5$ and $2^6$, respectively. These signals are applied to a latch 2k and, following inversion, are connected to the corresponding rate input terminals $\overline{A}, \overline{B}, \overline{C}, \overline{D}, \overline{E}, \overline{F}$ and $\overline{G}$ of the logic gate 2c. Thus, the rate input to the rate multiplier 2g is the complement (two's complement) of the numerical value in the second counter circuit 2e. The first and second counters 2b, 2e and the frequency divider circuit 2d receive a reset signal R, and the latch 2f receives a data sampling signal L. The signals R and L, along with the signal t and control signal C for controlling the oscillation of the CR oscillator 1, are provided by the timing signal generating circuit 5. The significance of these signals in the operation of the circuit shown in FIG. 5 will now be described with reference to the time chart of FIG. 6.

Figure 6:
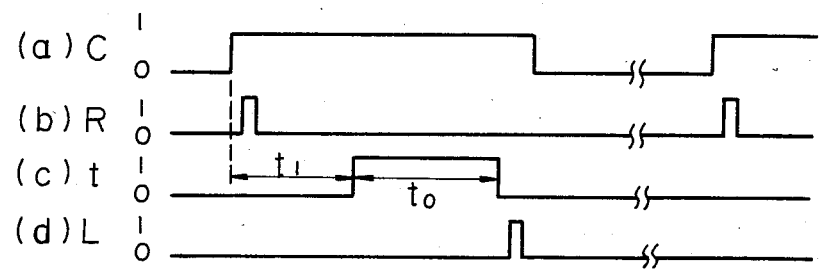
FIGS. 6 and 7 are a timing chart and block wiring diagram, respectively, useful in describing the operation of the circuit shown in FIG. 5.

When the oscillation control signal C, shown at (a) in FIG. 6, rises to the "1" logic level, the CR oscillator circuit 1 in FIG. 4 begins operating, producing an output signal which, in the form of the signal F1 to be measured, is applied to the logarithmic frequency transformation circuit 2 shown in FIG. 5. Next, the counters 2b, 2e and the frequency divider 2d are cleared by the reset signal R, that is, when said signal temporarily rises to logical "1" as shown in (b) of FIG. 6. After the CR oscillator circuit 1 has oscillated for a prescribed stabilizing period $t_1$, the signal t of the prescribed duration goes to logical "1", as shown in (c) of FIG. 6, whereupon the gating circuit 2a delivers the signal F1, namely the pulsed signal n, which is then divided down to a pulse train signal y by the rate multiplier 2g, comprising the counter 2b and logic gate 2c, and the frequency divider circuit 2d. The pulse train is counted by the second counter circuit 2e. As a result of the counting operation, the numerical value of the rate input to the rate multiplier 2g changes with time, whereby the dividing ratio of the rate multiplier gradually increases, while the maximum rate gradually decreases. Upon lapse of the measurement period $t_o$, the signal t goes to logical "0" to close the gating circuit 2a and halt the delivery of the pulsed signal n. Thenceforth, the data sampling signal L temporarily goes to logical "1", as shown in (d) of FIG. 6, so that the numerical value in counter 2e is stored, or "latched", in the latch 2f. After this occurs, the oscillation control signal C reverts to logical "0", suspending operation of the CR oscillator circuit 1.

The foregoing describes one full cycle of a measuring operation, as a result of which a numerical value F, proportional to the logarithm of the frequency of input signal F1, is held in the latch 2f. In the discussion that follows, the term "logarithmic frequency" will, in the broader sense, be taken to mean this numerical value F.

Although the above-described cycle of operation is repeated periodically, most consumer-oriented devices or devices for public use that require a temperature sensing or compensation function need have the foregoing measurement performed only once in one minute of time to permit the operation of the device to change in adequate fashion responsive to temperature fluctuations. Performing the measurement intermittently in this fashion serves to reduce the power consumed by the CR oscillator circuit 1.

Figure 7:
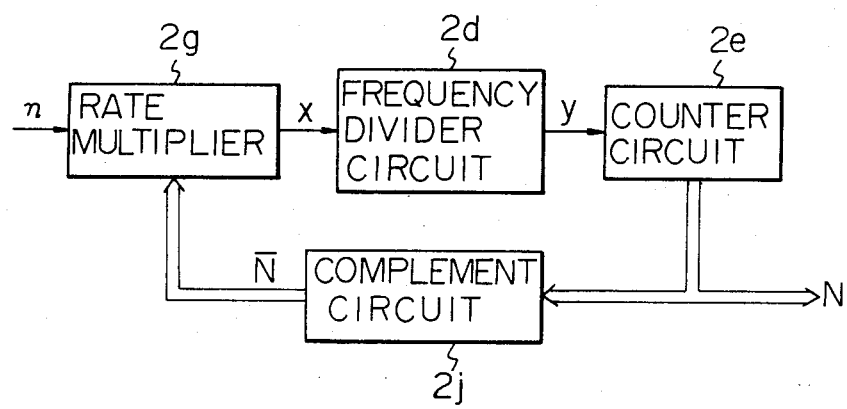

The operation of the logarithmic frequency transformation circuit 2, shown in FIG. 5, will now be discussed in further detail with reference to the block diagram of FIG. 7, showing the principal parts of the measurement circuit. The pulsed input n is divided down to the signal x by the rate multiplier 2g, and the signal x is further divided down to the signal y by the frequency divider 2d. The pulses constituting the signal y are counted by the counter 2e, whose output N is a numerical value indicating the result of the counting operation. N is applied to a complement circuit 2j, where it is converted into the two's complement $\overline{N}$ impressed upon the rate input terminals A through G of the rate multiplier 2g. If we assume that the maximum division ratio of the rate multiplier 2g is M+1, then the frequencies $f_n$, $f_x$ of the signals n, x will be related by the following equation:

$$f_x = [\overline{N}/(M+1)] \cdot f_n \quad (10)$$

Further, assuming that the division ratio of the frequency divider circuit 2d is K, the frequency $f_y$ of the signal y will be given by:

$$f_y = f_x/K = [\overline{N}/K(M+1)] \cdot f_n \quad (11)$$

Therefore, when the status of the count in counter 2e is the numerical value N, the number Pn of pulses in the signal n required for one pulse of the signal y to be produced can be found from the following:

$$P_n = K(M+1)/\overline{N} \quad (12)$$

When counting is performed to give a numerical value N of from zero up to a maximum value of M, the corresponding number Pn of pulses in the signal n is as shown in Table III, where the complement $\overline{N}$ is given by:

$$\overline{N} = M - N \quad (13).$$

TABLE III

| N | 0 | 1 | 2 | ... | n | n + 1 | ... | M − 2 | M − 1 | M |
|---|---|---|---|---|---|---|---|---|---|---|
| Pn | $\dfrac{K(M+1)}{M}$ | $\dfrac{K(M+1)}{M-1}$ | $\dfrac{K(M+1)}{M-2}$ | ... | $\dfrac{K(M+1)}{M-n}$ | $\dfrac{K(M+1)}{M-n-1}$ | ... | $\dfrac{K(M+1)}{2}$ | $\dfrac{K(M+1)}{1}$ | $\dfrac{K(M+1)}{0}$ |

Furthermore, the number of pulses in the signal n that will enter the circuit by the time the N-th pulse in the signal y is produced can be calculated from the following equation:

$$\sum_{n=0}^{N} P_n = \sum_{n=0}^{M-1} \frac{K(M+1)}{M-n} - \sum_{n=\overline{N}+1}^{M-1} \frac{K(M+1)}{M-n}$$

$$= \sum_{m=1}^{M} \frac{K(M+1)}{m} - \sum_{m=1}^{M-N-1} \frac{K(M+1)}{m} \quad (14)$$

$$= K(M+1)\left( r + l_n M + \frac{1}{2M} - \frac{a_2}{M(M+1)} - \frac{a_3}{M(M+1)(M+2)} \cdots \right) - K(M+1)\left( r + l_n(M-N-1) + \frac{1}{2(M-N-1)} - \frac{a_3}{(M-N-1)(M-N)} - \right.$$

-continued $$\left. \frac{a_3}{(M-N-1)(M-N)(M-N+1)} \cdots \right\}$$

In the above, $\gamma=0.5772$ (Euler constant), and $a_2=1/12$, $a_3=1/12$ Applying Eq. (14) to the circuit arrangement of FIG. 5, M is 127, and K is 16. Further, the numerical value N is the logarithmic frequency F. This gives us:

$$\sum_{n=0}^{F} Pn \approx 2048\{4.8481 - l_n(126-F) - 1/2(126-F) + \qquad (15)$$

$$1/12(126-F)(127-F) + 1/12(126-F)(127-F)(128-F)\}$$

Figure 8:
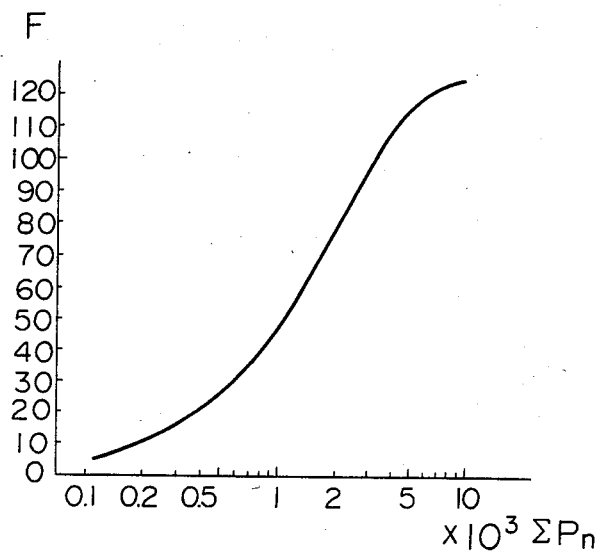
FIGS. 8 and 9 are graphs depicting the characteristics of the circuit shown in FIG. 5.

FIG. 8 is the curve obtained when Eq. (15) is graphed. Here the numerical value F in the third counter 2e of FIG. 5 is plotted along the vertical axis, while the horizontal axis is a logarithmic scale indicating the number of pulses $\Sigma Pn$ in the pulsed signal n delivered by the NAND gate 2a. It will be seen that the curve is approximately linear for a signal n pulse range of from 500 to 5000 pulses, so that the numerical value F will be roughly proportional to the log of the pulse number $\Sigma Pn$ within said range. Since the number of pulses $\Sigma Pn$ delivered by the gating circuit 2e within a predetermined period of time may be thought of as the frequency of the signal n, the numerical value F in counter 2e is a value proportional to the log of the frequency. In other words, F represents the logarithmic frequency.

Figure 9:
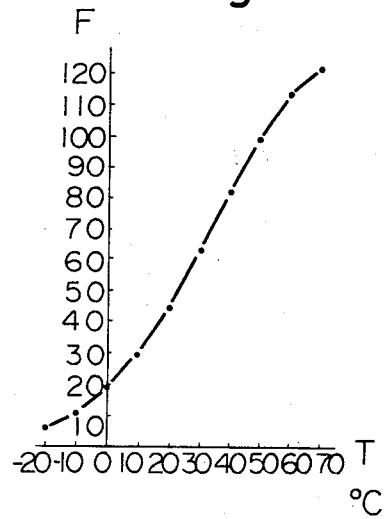

FIG. 9 is a graphical representation of temperature T versus logarithmic frequency F for a case where a signal having a temperature-frequency characteristic of the type shown in FIG. 2 has its frequency transformed into a logarithmic frequency by the circuit arrangement of FIG. 5. In plotting the curve, the NAND gate 2a was opened for a period $t_o$ equivalent to 1/32 second. The graph clearly shows that a temperature T of from $-20°$ C. to 70° C. has been converted into integral values ranging from 6 to 122. The conversion curve describes a substantially straight line in the region of ordinary temperatures, but is slightly curvilinear in the high- and low-temperature regions. Accordingly, while the resolution for temperatures in the region below $-3°$ C. and above 65° C. is 2° C., a resolution of 0.5° C. is obtained in the vicinity of room temperature. The logarithmic frequency F obtained in this manner is a seven-bit binary number which, by being used to address the read-only memory 3, is converted into data required directly for temperature compensation.

Figure 10:
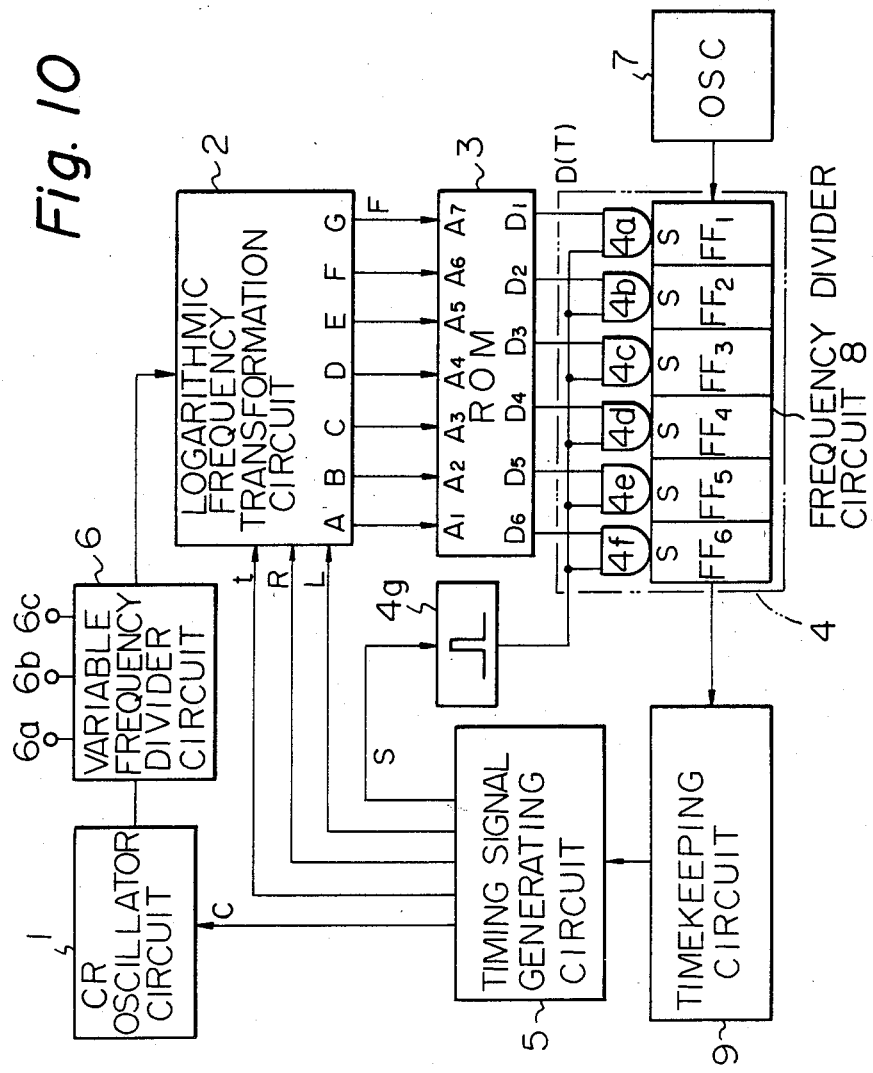
FIG. 10 is a block wiring diagram illustrating, in greater detail, the first embodiment of the invention shown in FIG. 1.

Reference will now be had to FIG. 10 which is a block diagram of an arrangement wherein the temperature compensating system of the present invention is applied to an electronic timepiece to effect temperature compensation for timekeeping accuracy. Fig. 10 is useful for describing details of the read-only memory 3 and adjustment circuit 4 shown in FIG. 1.

In FIG. 10, numeral 1 designates the CR oscillator circuit of FIG. 4, numeral 2 the logarithmic frequency transformation circuit of FIG. 5, and numeral 3 the read-only memory to which the seven binary bit signals A, B, C, D, E, F and G, produced by the logarithmic frequency transformation circuit 2 and representing the logarithmic frequency F, are applied as address input signals A1, A2, A3, A4, A5, A6 and A7, respectively. The output data D(T) of the read-only memory 3 are six bits D1, D2, D3, D4, D5 and D6. Each of these six bit signals is applied to one input terminal of respective ones of two-input AND gates 4a, 4b, 4c, 4d, 4e and 4f constituting the adjustment circuit 4, which is provided to adjust the timekeeping accuracy of the timepiece circuit. The outputs of these six AND gates 4a, 4b, 4c, 4d, 4e and 4f are connected to direct set terminals S on corresponding flip-flops FF1, FF2, FF3, FF4, FF5 and FF6. These six flip-flops constitute a frequency divider circuit 8 for successively dividing a signal, produced by a crystal-controlled oscillator 7, down to a unit time signal serving as a time base for the timepiece. The output signal of the frequency divider circuit 8 is applied to a timekeeping circuit 9, constituting a principal portion of the timepiece circuitry, and is counted as a unit time signal. Reference numeral 5 denotes the timing signal generating circuit which, in response to conditions specified by the timekeeping circuit 9, produces the oscillation control signal C, the gating signal t, the reset signal R, the latch signal L, and an adjustment timing signal S. The function of signals C, t, R and L has already been described and no further discussion thereof is required. The adjustment timing signal S decides the operation timing of the timekeeping accuracy adjustment circuit 4 and is converted into an impulse signal, of a width smaller than that of the pulses in the output of the crystal-controlled oscillator circuit 7, by means of an impulse conversion circuit 4g. *The impulse signal is applied to the second input terminal of each of the six AND gates 4a through 4f.*

The output of the CR oscillator circuit 1 is applied to a variable frequency divider circuit 6 for correcting the error that develops in the product of the reference resistance $R_o$ and capacitance C of the thermister and time constant capacitor, respectively, contained in the CR oscillator circuit. The variable frequency divider circuit 6 is a five-bit rate multiplier 2g and has three adjustment terminals 6a, 6b, 6c to which binary signals are applied. By suitably selecting the logic levels of these binary inputs, any of eight different output frequencies can be obtained through multiplying the input frequency by 31/32, 30/32, 29/32, 28/32, 27/32, 26/32, 25/32, or 24/32. Taking an output frequency of 28/32 as the designed center value, the range over which the error in the time constant $CR_o$ can be corrected will be $+16\%$ to $-12.5\%$, and the combined error will be about $\pm 1.8\%$.

A temperature compensation operation for maintaining the timekeeping accuracy of the timepiece takes place in the following manner. The timing signal generating circuit 5 generates the series of timing control signals C, t, R and L, shown in FIG. 6, whereby the CR oscillator circuit 1 produces a signal having a frequency f which is an exponential function of temperature. This frequency is corrected by the variable frequency divider circuit 6, and the logarithmic frequency F is subsequently measured by the logarithmic frequency transformation circuit 2. The logarithmic frequency F is used to address the read-only memory 3, which responds by delivering temperature compensation data in conformance with the result of the measuring operation. This output data D(T) is composed of the bits D1 through D6. Bit D1 is a signal which controls whether the number of clock pulses which enter the flip-flop FF1 are increased by one pulse per minute and, likewise, the bits D2, D3, D4, D5, D6 are signals for controlling whether the clock pulses which enter the corresponding flip-flips FF2, FF3, FF4, FF5, FF6 are increased by one pulse per minut. Since the clock pulses which enter the flip-flops FF1 through FF6 possess weights which are once, twice, four times, eight times, 16 times and 32 times those of the pulses generated by the crystal-controlled oscillator circuit 7, the output data D(T) of the read-only memory 3 can be thought of as numerical data which designate to frequency divider circuit 8 how many extra pulses from the crystal-controlled oscillator 7 are to be added to the output frequency of the divider circuit in one minute. This numerical data D(T) causes the addition operation to take place by directly setting the frequency divider circuit 8 through the six AND gates 4a through 4f when the adjustment timing signal S is generated, the latter occurring once per minute. This technique is equivalent to raising the oscillation frequency of the crystal-controlled oscillator circuit 7 such that the average increase in frequency is D(T)/60 hertz, using the output data D(T) of the read-only memory 3.

If the standard oscillation frequency of the crystal-controlled oscillator circuit 7 is 32768 hertz, then the frequency correction factor E (PPM) will be given by the following:

$$E = [(D(T)/32768 \times 60] \times 10^6 \div 0.51 \times D(T) \quad (PPM) \tag{16}$$

For a case where a tuning fork-type crystal vibrator which operates in the region of 32 kilohertz is employed, Eq. (17) shown below will give the temperature characteristic of the frequency of the crystal-controlled oscillator circuit 7. Here, $\Delta f_o$ (Hz) denotes the error term dependent upon the temperature T (K) of the oscillation frequency of the crystal-controlled oscillator circuit 7; it is adjusted to be zero at room temperature, i.e., 296 (K).

$$\Delta f_o = -a(T-296)^2 (Hz) \tag{17}$$

In Eq. (17), a is a constant, having a value of about 1100, referred to as the secondary temperature coefficient. In order to diminish $\Delta f_o$ to zero in Eq. (17), $\Delta f_o$ should satisfy the following:

$$E \times 38768 = \Delta f_o \tag{18}$$

We therefore obtain the following equation:

$$D(T) = a(T-296)^2/(0.51 \times 32768) \div 0.066 (T-296)^2 \tag{19}$$

The output data D(T) from the read-only memory 3 is a binary representation of the numerical value obtained by substituting the temperature T into Eq. (19), where T corresponds to the numerical value of the logarithmic frequency F serving as the address input to the read-only memory. Table IV shows output data D(T) and frequency correction factor E for a case where the address input to the read-only memory 3 is determined by the conversion graph of FIG. 9. It will be appreciated from the Table that the temperature-induced error takes on a large value, exceeding the limits of the temperature compensation, at temperatures below −8° C. and above +54° C.

TABLE IV

| Temperature | | ROM Input | ROM Output D (T) | | | | | | Correction Factor |
|---|---|---|---|---|---|---|---|---|---|
| °C. | °K. | F | $D_6$ | $D_5$ | $D_4$ | $D_3$ | $D_2$ | $D_1$ | E(PPM) |
| −20 | 253 | 6 | 1 | 1 | 1 | 1 | 1 | 1 | +32 |
| −10 | 263 | 11 | 1 | 1 | 1 | 1 | 1 | 1 | +32 |
| −8 | 265 | 13 | 1 | 1 | 1 | 1 | 1 | 1 | +32 |

TABLE IV-continued

| Temperature | | ROM Input | ROM Output D (T) | | | | | | Correction Factor |
|---|---|---|---|---|---|---|---|---|---|
| °C. | °K. | F | $D_6$ | $D_5$ | $D_4$ | $D_3$ | $D_2$ | $D_1$ | E(PPM) |
| 0 | 273 | 19 | 1 | 0 | 0 | 0 | 1 | 1 | +17.85 |
| 10 | 283 | 29 | 0 | 0 | 1 | 0 | 1 | 1 | +5.61 |
| 20 | 293 | 45 | 0 | 0 | 0 | 0 | 0 | 1 | +0.51 |
| 23 | 296 | 50 | 0 | 0 | 0 | 0 | 0 | 0 | 0 |
| 30 | 303 | 63 | 0 | 0 | 0 | 0 | 1 | 1 | +1.53 |
| 40 | 313 | 83 | 0 | 1 | 0 | 0 | 1 | 1 | +9.69 |
| 50 | 323 | 100 | 1 | 1 | 0 | 0 | 0 | 0 | +24.48 |
| 54 | 327 | 106 | 1 | 1 | 1 | 1 | 1 | 1 | +32 |
| 60 | 333 | 114 | 1 | 1 | 1 | 1 | 1 | 1 | +32 |
| 70 | 343 | 122 | 1 | 1 | 1 | 1 | 1 | 1 | +32 |

In connection with the operation of the circuit shown in FIG. 10, there are cases where the adjustment for timekeeping accuracy is performed instantaneously once every minute, so that it is unnecessary to preserve the adjustment data continuously. In such cases, therefore, the latch 2f shown in the logarithmic frequency transformation circuit of FIG. 5 can be dispensed with, and the latch signal L can be used instead as the adjustment timing signal S. The same is true when the temperature compensating device is employed to temperature-compensate the display density of an electrochromic display, referred to as an ECD. This is because the ECD display density is influenced by temperature only during the fixed periods in which the display is changed. Accordingly, the temperature compensation data is unnecessary, and therefore need not be preserved, when no change in the display is effected. In many applications, however, the temperature compensation data must be constantly available. In such cases the arrangement of FIG. 5 may be adopted.

Described next will be another embodiment of the present invention, in which an electronic timepiece is subjected to temperature compensation on the basis of numerical data obtained from a temperature measuring system for logarithmically transforming the period, rather than the frequency, of the output signal produced by the CR oscillator circuit.

Figure 11:
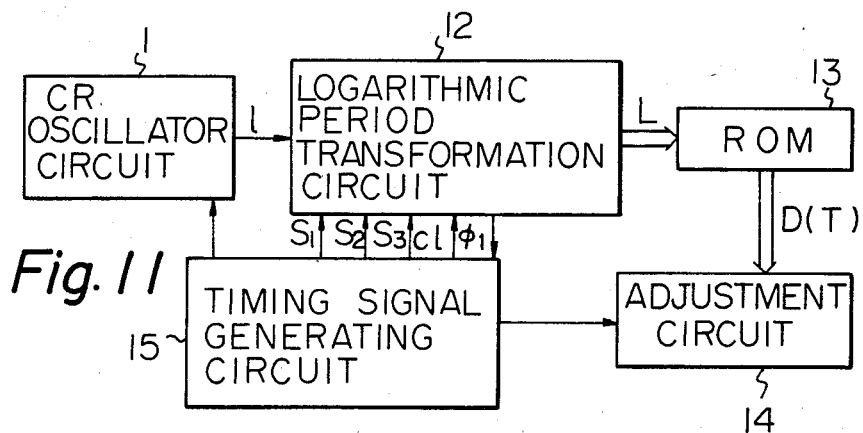
FIG. 11 is a block wiring diagram of a temperature compensating device for an electronic timepiece, illustrating the general construction of a second embodiment of the present invention.

Referring now to FIG. 11, as in the first embodiment of the invention, the present embodiment includes a CR oscillator circuit 1 which has a thermistor as the resistance element for forming the time constant, and which develops a change in oscillation frequency owing to a change in ambient temperature. CR oscillator circuit 1 has exactly the same construction as that shown in FIG. 4. Also included is a logarithmic period transformation circuit 12 for producing a logarithmic period L by computing the logarithm of the period 1 of the signal produced by the CR oscillator circuit 1. The logarithmic period transformation circuit 12 measures the logarithm of the interval between successive pulses having the period 1 (which varies with temperature), thereby producing the logarithmic period L as numeric data. This data is employed as the address input to a read-only memory 13. It should be noted that, in accordance with this embodiment of the invention, the circuit arrangement having the CR oscillator circuit 1 and logarithmic period transformation circuit 12, alone or in combination with the read only memory 13, constitute a temperature measuring device.

Any change in ambient temperature will cause a different address to be applied to the read-only memory 13, from the output side whereof numerical data D(T) will be delivered having a specific functional relationship dependent upon the temperature. The numerical data D(T) acquired from the read-only memory 13 is applied to an adjustment circuit 14 for varying the condition of the device undergoing the temperature compensation. In other words, the adjustment circuit 4 assures that the device will be temperature-compensated in line with the particular objective. In this embodiment, the circuit arrangement including the CR oscillator circuit 1, logarithmic period transformation circuit 12, read-only memory 13 and adjustment circuit 4 constitute a temperature compensating system in accordance with the present invention.

The embodiment further includes a timing signal generating circuit 15 under the control of which the CR oscillator circuit 1, logarithmic period transformation circuit 12 and adjustment circuit 14 operate in accordance with a predetermined sequence. To this end, the timing signal generating circuit 15 produces a clock signal which serves as an accurate time base, particularly for clocking the logarithmic period transformation circuit 12.

In the above arrangement, the output signal of the CR oscillator circuit 1 has a period l expressed by the following formula:

$$l = hCR \quad (20)$$

where R is the magnitude of the time-constant resistance, C is the magnitude of the time constant capacitance, and h is a constant. If the time constant resistance consists solely of the thermistor, then substituting R from Eq. (1) into Eq. (20) will give us:

$$l = h C R_o \exp(B/T - B/T_o) \quad (21)$$
$$= h C R_o e^{-B/T_o} \cdot e^{B/T}$$
$$= A e^{B/T}$$

where A is as expressed by the following:

$$A = hCR_o e^{-B/T_o} \quad (2)$$

Figure 12:
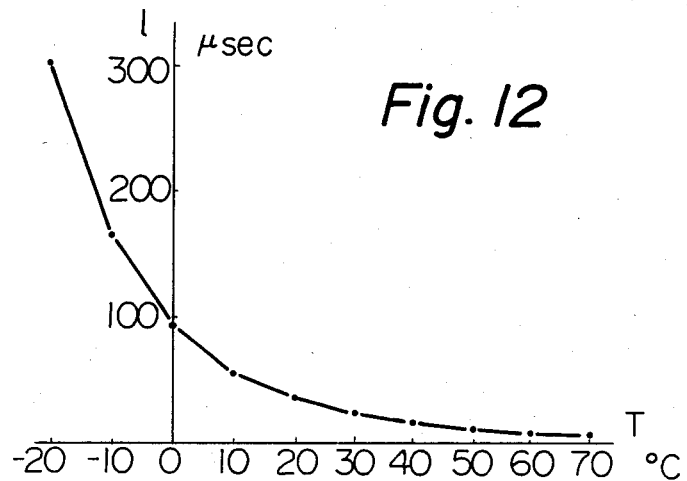
FIGS. 12 and 13 are graphs showing the relationship between ambient temperature and the period of oscillation of a CR oscillator circuit containing a thermistor.

If the reference resistance $R_o$ is one megohm, the capacitance C is 20 picofarads, the reference temperature $T_o$ is 25° C. (=298° K.), the thermistor constant B is 4000K, and h is 1.39, then the value of A will be approximately $4.12 \times 10^{-11}$. Under these conditions, the period l of the output signal from the CR oscillator circuit 1 declines sharply as the temperature T rises, as depicted by the graph of FIG. 12. In this case the temperature T, period l and logarithmic period L are related as shown in the following Table V.

TABLE V

| Temperature T | | Period | Logarithmic Period |
|---|---|---|---|
| °C. | °K. | l (μsec) | L (μsec) |
| −20 | 253 | 302.451 | 2.481 |
| −19 | 254 | 284.199 | 2.454 |
| −10 | 263 | 165.798 | 2.220 |
| 0 | 273 | 94.979 | 1.978 |
| 10 | 283 | 56.595 | 1.753 |
| 20 | 293 | 34.936 | 1.543 |
| 30 | 303 | 22.264 | 1.348 |
| 40 | 313 | 14.603 | 1.164 |
| 50 | 323 | 9.831 | 0.993 |
| 60 | 333 | 6.778 | 0.831 |
| 69 | 342 | 4.941 | 0.694 |
| 70 | 343 | 4.775 | 0.679 |

In the present example, a one-degree variation (C) in the temperature T from 69° C. to 70° C. causes a change of 0.166 microsecond in the period l. If this 0.166 microsecond change is adopted as a unit, then the difference between the period at 70° C. and at −20° C. will be approximately 1794. Since expressing such a figure as a binary number would require 11 bits, expressing temperatures over the range of from 70° C. to −20° C. at one-degree (C) increments would result in considerable redundancy. To curtail such redundancy, the period l need only be subjected to a logarithmic transformation to express it as the logarithmic period L. Taking the log of Eq. (21) will give us L, as follows:

$$L = \log l = \log A + (B/T) \log e \quad (23)$$

Figure 13:
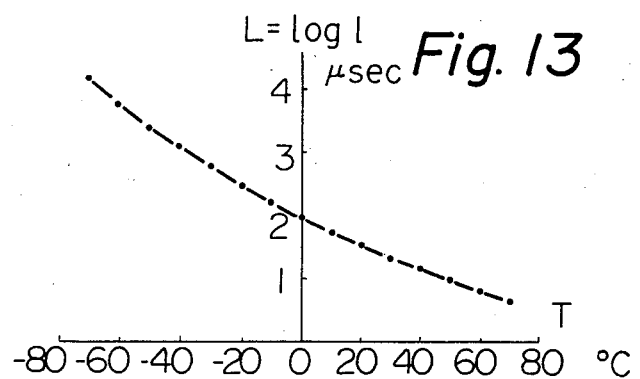

The graph of Eq. (23) is a hyperbola, as depicted in FIG. 13, wherein it will be appreciated that the curve approximates a straight line for a temperature T of greater than −20° C. (253° K.) and less than 70° C. (343° K.). It will be seen that the slope of the curve is slight in the high-temperature region. Thus, for a one-degree variation (C) in the temperature T from 69° C. to 70° C., the change in the logarithmic period L will be about 0.015 μsec. Using this value as the unit of measurement, the difference between the logarithmic period at 70° C. and at −20° C. will be approximately 122. This is a value which can be expressed by only seven binary bits, so that redundancy is curtailed as desired. By logarithmically compressing the period l of the signal from the CR oscillator circuit 1 in this manner, the resulting data is shortened by four bits, and the number of addresses required for the read-only memory 13 is reduced to 1/16 of that originally required. This makes it possible to achieve a major reduction in the capacity of the memory 13. Furthermore, since the change in the logarithmic period L may be considered to be substantially linear within a certain range of temperatures, as mentioned above, the arrangement of the invention when applied to a simple thermometer allows the measured value obtained at the output of the logarithmic period transformation circuit 12 to be employed directly as the temperature reading, without requiring a functional conversion using the read-only memory 13.

The foregoing describes the principle of the invention based on the block diagram of FIG. 11. The elements constituting the arrangement of FIG. 11 will now be described in more concrete form with reference to detailed circuitry.

As set forth above in connection with the circuit arrangement of FIG. 4, the CR oscillator circuit 1 begins oscillating when the oscillation control signal C from the timing signal generating circuit goes to logical "1". The oscillator circuit output is a square wave signal F1 obtained from the output of inverter 1d and having a period l, as expressed by Eq. (20). The constant h in this case is 1.39. As described earlier, the thermister 1d introduces some error, and there is also some error in the capacitance of capacitor 1b. It will therefore be necessary to correct for these errors. This can be carried out by adjusting the value of C, or by performing variable frequency division of the output signal, as described for the embodiment of FIG. 4. In the latter case, the constant h in Eq. (20) will be given by the following:

$$h = 1.39h \quad (24)$$

where h is the set dividing ratio.

Figure 14:
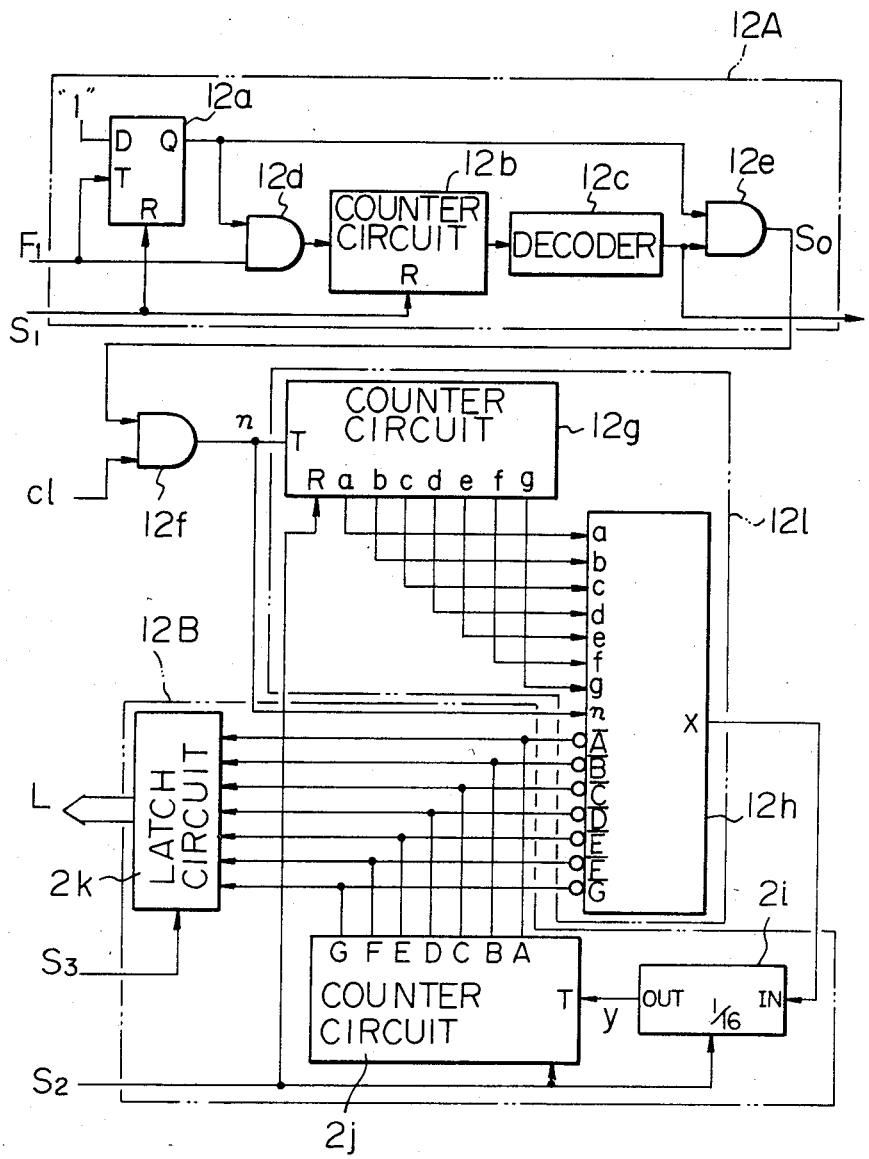
FIG. 14 is a circuit diagram illustrating a logarithmic period measurement circuit included in the arrangement of FIG. 11.

FIG. 14 illustrates a specific example of the logarithmic period transformation circuit 12 for measuring the logarithmic period L of the output signal F1 from the CR oscillator circuit 1 shown in FIG. 4, or of the signal F1 obtained by correcting said output signal by means of a suitable frequency division. The logarithmic period transformation circuit 12 essentially comprises a gate control signal generating circuit 12A, a gating circuit 12f controlled by the gate control signal generating circuit 12A, and a logarithmic transformation circuit comprising a rate multiplier 12l for dividing the output signal of the gate 12f, and a counter circuit 12B for dividing, counting and latching the number of pulses contained in the output signal of the rate multiplier 12l.

The gate control signal generating circuit 12A comprises a D-type flip-flop 12a, a four-bit binary counter 12b, a decoder 12c, and two AND gates 12d, 12e each having two inputs. The clock input terminal T to the D-type flip-flop 12a receives the signal F1, which is to be measured. The data input terminal D is set permanently to logical "1". The AND gate 12d finds the logical product of the Q output of flip-flop 12a and the signal F1, and delivers its output signal to the counter 12b where it is counted. When the result of the counting operation reaches a specified value, the logical output of decoder 12c changes over from "1" to "0". The AND gate 12e, meanwhile, finds the logical product between the Q output of flip-flop 12a and the output of the decoder 12c, the logical product serving as a gate control signal $S_o$. The reset input terminals R of the flip-flop 12a and counter 12b are tied together and receive a control signal S1 supplied by the externally located timing signal generating circuit 5.

In the operation of the gate control signal generating circuit 12A having the foregoing construction, the control signal S1 ordinarily is logical "1", flip-flop 12a and counter 12b are in the reset state, the Q output of flip-flop 12a is logical "0", and the output of decoder 12c is logical "1". As a result, the gate control signal $S_o$ from AND gate 12e is logical "0". When the control signal S1 changes in state to logical "0", the Q output of D-type flip-flop 12a is changed over in state to logical "1" by the first negative-going transition, or trailing edge, of the signal F1. This causes the gate control signal $S_o$ from AND gate 12e to go to logical "1", and allows the signal F1 to pass through the AND gate 12d for counting by the counter 12b. When the result of the counting operation reaches a predetermined numerical value of 10 (ten), the logical output of decoder 12c changes over to "0", whereby the gate control signal $S_o$ reverts to logical "0". The output signal $\phi$ of decoder 12c is transmitted to the externally located timing signal generating circuit 15, as a result of which the control signal S1 also reverts to logical "1", thereby completing one cycle of operation. The effect of the operation cycle is that the output of AND gate 12e goes to logical "1" for a length of time which is ten times the period l of the signal F1, whereby the gating circuit 12f, constituted by an AND gate, is opened for the same length of time to deliver a clock C1 as a time base. The clock C1 is supplied by the timing signal generating circuit 15.

The output of the gating circuit 12f consists of groups of pulses of signal C1, periodically transferred by AND gate 12F and designated as n, which are input to the rate multiplier 12l. The number of pulses in each group varies in inverse proportion to the frequency of signal F1, i.e. in proportion to the period of that signal. Rate multiplier 12l comprises a second counter 12g, which is a seven-bit binary counter, and a logic gate circuit 12h. The logic gate circuit 12h produces an output signal x. The relationship between the output signal X and the logic levels appearing on rate input terminals $\overline{A}$, $\overline{B}$, $\overline{C}$, $\overline{D}$, $\overline{E}$, $\overline{F}$ and $\overline{G}$ are as given by expressions (8) and (9) above. with reference to the embodiment of FIG. 5. Thus, the signal x generated by the logic gate 12h is a pulse train consisting of a number of pulses proportional to the binary number set at the rate input terminals $\overline{A}$ through $\overline{G}$.

The output signal x of logic gate 12h is coupled to the counter circuit 12B where it is received by a frequency divider circuit 12i, having a dividing ratio of 16, constituting part of the counter circuit. Following division, signal x is counted by a third counter 12j which is a seven-bit binary counter. The latter produces output signals A, B, C, D, E, F and G, which are bit signals of binary numbers having weights of $2^0$, $2^1$, $2^2$, $2^3$, $2^4$, $2^5$ and $2^6$, respectively. These signals are applied to a latch 12k and, following inversion, are connected to the corresponding rate input terminals $\overline{A}$, $\overline{B}$, $\overline{C}$, $\overline{D}$, $\overline{E}$, $\overline{F}$ and $\overline{G}$ of the logic gate 12h. Thus, the rate input to the rate multiplier 121 is the compliment (two's compliment) of the numerical value in the third counter 12j. The second and third counters 12g, 12j and the frequency divider circuit 12i receive a reset signal S2 from the timing signal generating circuit 15, and the latch 12k receives a latch signal S3, also provided by circuit 15. Reference will now be had to the timing chart of FIG. 15 to describe the operation of the logarithmic period transformation circuit 12 having the foregoing construction.

Figure 15:
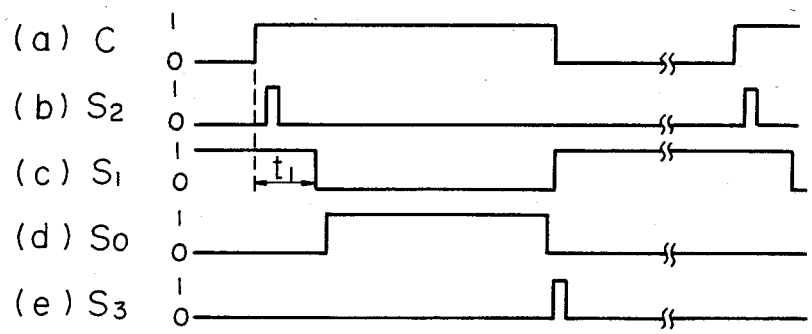
FIGS. 15 and 16 are a timing chart and block wiring diagram, respectively, useful in describing the operation of the circuit shown in FIG. 14.

When the oscillation control signal C, shown at (a) in FIG. 15, rises to the "1" logic level, the CR oscillator circuit 1 in FIG. 4 begins operating. producing an output signal which, following a frequency adjustment, is applied to the logarithmic period transformation circuit 12 in FIG. 14 as the signal F1 to be measured. Next, the counters 12g, 12j and the frequency divider 12i are cleared by the reset signal S2, that is, when said signal temporarily rises to logical "1". After the CR oscillator circuit 1 begins oscillating and following the passage of a prescribed stabilizing period $t_1$, the measurement control signal S1 goes to logical "0", as shown in (c) of FIG. 15, whereby the gate signal generating circuit 12A operates in the manner described above to produce a gate control signal $S_o$ at logic level "1", as depicted in (d) of FIG. 15. In consequence, gate 12f opens to generate the pulse train signal n, which is then divided down to a pulse train signal y by the rate multiplier 121, comprising the counter 12g and logic gate 12h, and the frequency divider circuit 12i. The pulse train is counted by the third counter circuit 12j. As a result of the counting operation, the numerical value of the rate input to the rate multiplier 121 changes with time, whereby the dividing ratio of the rate multiplier gradually increases, while the maximum rate gradually decreases. Eventually, the gate control signal $S_o$ goes to logical "0" to close the gating circuit 12f and halt the delivery of the pulsed signal n. Thenceforth, the latch signal S3 temporarily goes to logical "1", as shown in (e) of FIG. 15, so that the numerical value in counter 12j is stored in the latch circuit 12k. At the same time, the oscillation control signal C reverts to logical "0", suspending operation of the CR oscillator circuit 1.

The foregoing describes one full cycle of a measuring operation, as a result of which a numerical value L, proportional to the logarithm of the period of input signal F1, is preserved in the latch circuit 12k. In the discussion that follows, the term 37 logarithmic period" will, in the broader sense, be taken to mean this numerical value L.

Although the above-described cycle of operation is repeated periodically, most consumer-oriented devices that require a temperature compensation need have the foregoing measurement performed only once in one minute of time to permit adequate temperature tracking. Performing the measurement intermittently in this fashion is for the purpose of reducing the electric power consumed by the CR oscillator circuit 1.

Figure 16:
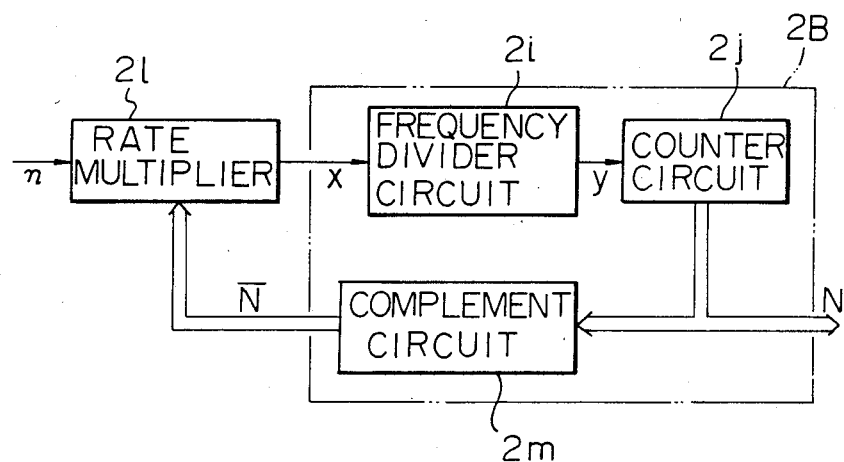

The operation of the logarithmic period transformation circuit 12, shown in FIG. 14, will now be discussed in further detail with reference to the block diagram of FIG. 16, showing the principal parts of the transformation circuit. The pulsed input n is divided down to the signal x by the rate multiplier 121, and the signal x is further divided down to the signal y by the frequency divider 12i. The pulses constituting the signal y are counted by the counter 12j, whose output N is a numerical value indicating the result of the counting operation. N is applied to a complement circuit 12m, where it is converted into the two's complement N impressed upon the rate input terminals A through G of the rate multiplier 121.

The relationships between the signals in the embodiment of FIG. 16 are identical to those of the embodiment of FIG. 7, given by equations (10) to (15) above. Applying Eq. (14) to the circuit arrangement of FIG. 14, M is 127, and K is 16. Further, the numerical value N is the logarithmic period L. This gives us:

$$\sum_{n=0}^{L} Pn \approx 2048\{4.8481 - l_n(126 - L) - 1/2(126 - L) + \quad (25)$$

$$1/12(126 - L)(127 - L) + 1/12(126 - L)(127 - L)(128 - L)\}$$

Figure 17:
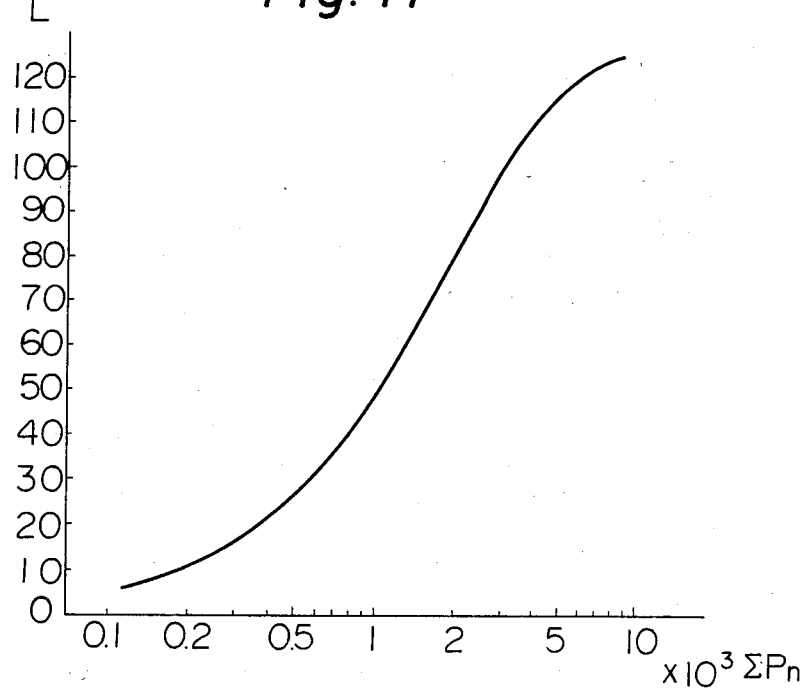
FIGS. 17 and 18 are graphs depicting the characteristics of the circuit shown in FIG. 5.

FIG. 17 is the curve obtained when Eq. (25) is graphed. Here the numerical value L in the third counter 12j of FIG. 14 is plotted along the vertical axis, while the horizontal axis is a logarithmic scale indicating the number of pulses Pn in the pulsed signal n delivered by the gating circuit 12f. It will be seen that the curve is approximately linear for a signal n pulse range of from 500 to 5000 pulses, so that the numerical value L will be roughly proportional to the log of the pulse number ΣPn within said range. When the gating control circuit signal $S_o$ is logical "1", the number of pulses ΣPn delivered by the gating circuit 12f may be thought of as the period of the signal n, so that the numerical value L in counter 12j is a value proportional to the log of the period. In other words, L represents the logarithmic period.

It can thus be understood that in this second embodiment, as in the first embodiment described above, groups of pulses are periodically input to a logarithmic transformation circuit, with the number of pulses in each group varying in accordance with the frequency of the output signal F1 from CR oscillator circuit 1. However in this embodiment, the number of pulses in each group varies in inverse proportion to the frequency of signal F1, i.e. in direct proportion to the period of signal F1. With the first embodiment, on the other hand, the number of pulses in each group varies in direct proportion to the frequency of signal F1. In both this embodiment and the first embodiment, a control circuit is utilized to produce these groups of pulses from signal F1. In the first embodiment, this control circuit simply consists of a gating circuit, which is periodically enabled to transfer groups of pulses of signal F1 to be input to the logarithmic transformation circuit during fixed time intervals. In the second embodiment, the control circuit consists of circuit 12A, which periodically produces gating pulses which vary in duration in accordance with the frequency of signal F1, and a gating circuit (12f) which transfers groups of pulses from a fixed-frequency pulse train under the control of the latter gating pulses. The subsequent processing of the groups of pulses thus produced is identical in both of the embodiments.

Figure 18:
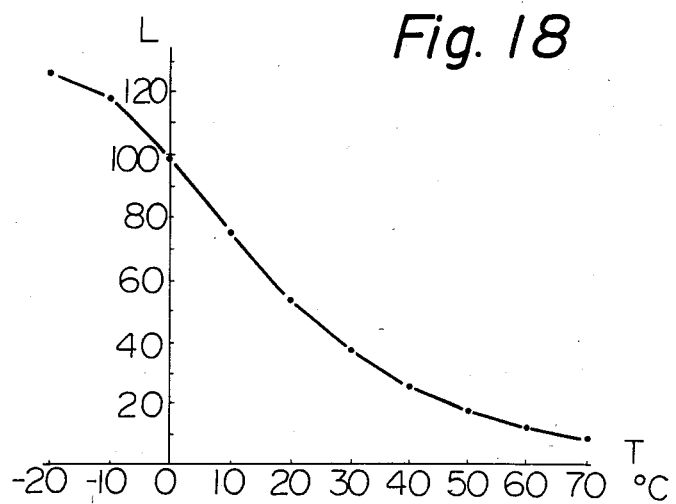

FIG. 18 is a graphical representation of temperature T versus logarithmic period L for a case where a signal having a temperature-period characteristic of the type shown in FIG. 12 has its period transformed into a logarithmic period by the circuit arrangement of FIG. 14. In plotting the curve, the output signal F1 of the CR oscillator circuit 1 was frequency-divided by 32 (by means of a frequency divider which is not shown) to provide the signal for measurement, and the frequency of the clock C1 was 100 kilohertz. The graph clearly shows that a temperature T of from −20° C. to 70° C. has been converted into integral values ranging from 126 to 9. The conversion curve describes a substantially straight line in the region of ordinary temperatures, but is slightly curvilinear in the high- and low-temperature regions. Accordingly, while the resolution for temperatures in the region below 10° C. and above 40° C. is 2° C., a resolution of 0.5° C. is obtained in the vicinity of 10° C. The logarithmic period L obtained in this manner is a seven-bit binary number which, by being used to address the read-only memory 13, is converted into data required directly for temperature compensation.

Figure 19:
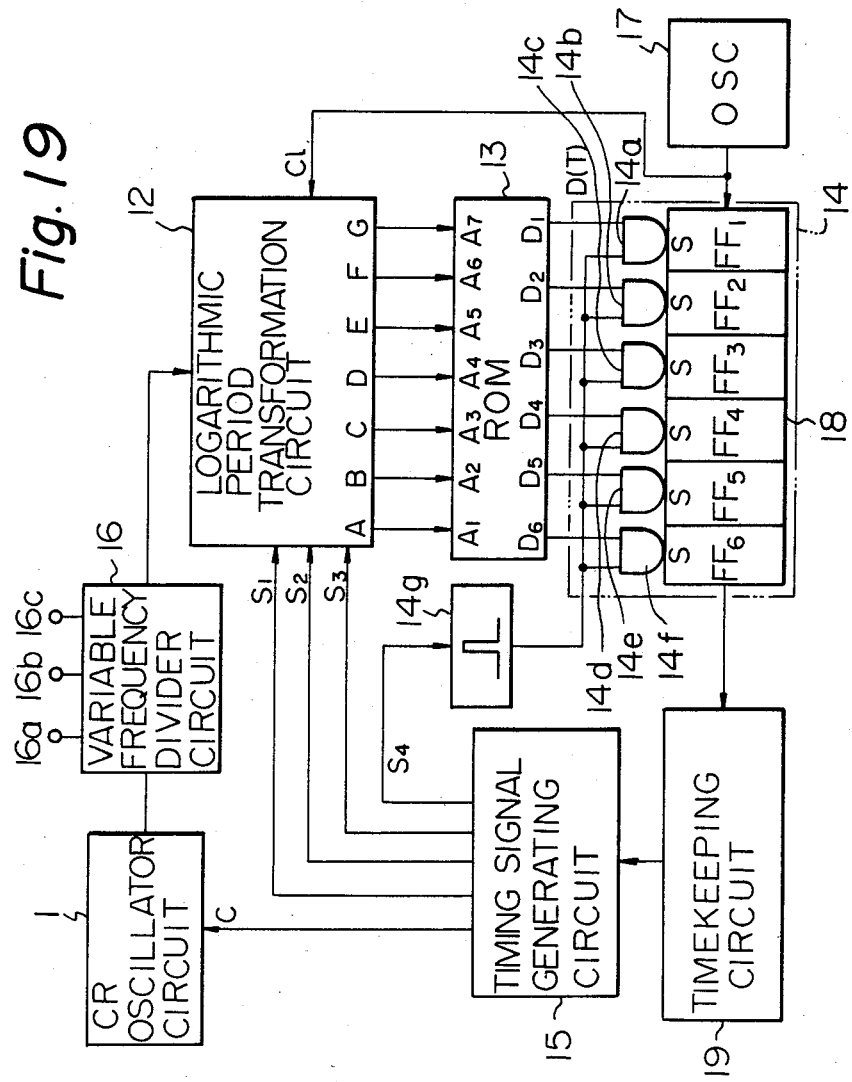
FIG. 19 is a block wiring diagram illustrating, in greater detail, the second embodiment of the invention shown in FIG. 11.

FIG. 19 is a block diagram of an arrangement wherein the temperature measuring system of the present invention is applied to an electronic timepiece to effect temperature compensation for timekeeping accuracy. FIG. 19 is useful particularly for describing the details of the read-only memory 13 and adjustment circuit 14 shown in FIG. 11.

In FIG. 19, numeral 1 designates the CR oscillator circuit of FIG. 4, 12 the logarithmic period transformation circuit of FIG. 14, and 13 the read-only memory to which the seven binary bit signals A, B, C, D, E, F and G, produced by the logarithmic period transformation circuit 12 and representing the logarithmic period L, are applied as address input signals A1, A2, A3, A4, A5, A6 and A7, respectively. The output data D(T) of the read-only memory 3 are six bits D1, D2, D3, D4, D5 and D6. Each of these six bit signals is applied to one input terminal of respective ones of two-input AND gates 14a, 14b, 14c, 14d, 14e and 14f constituting the adjustment circuit 14, which is provided to adjust the timekeeping accuracy of the timepiece circuit. The outputs of these six AND gates 14a, 14b, 14c, 14d, 14e and 14f are connected to direct set terminals S on corresponding flip-flops FF1, FF2, FF3, FF4, FF5 and FF6. These six flip-flops constitute a frequency divider circuit 18 for successively dividing a signal, produced by a crystal-controlled oscillator 17, down to a unit time signal serving as a time base for the timepiece. The output signal of the frequency divider circuit 18 is applied to a timekeeping circuit 19, constituting a principal portion of the timepiece circuitry, and is counted as a unit time signal. Reference numeral 15 denotes the timing signal generating circuit which, in response to conditions specified by the timekeeping circuit 19, produces the oscillation control signal C, the control signal S1, the reset signal S2, the latch signal S3, and an adjustment timing signal S4. The function of signals C, S1, S2 and S3 has already been described and no further discussion thereof is required. The adjustment timing signal S4 decides the operation timing of the timekeeping accuracy adjustment circuit 14 and is converted into an impulse signal, of a width smaller than that of the pulses in the output of the crystal-controlled oscillator circuit 17, by means of an impulse conversion circuit 14g. The impulse signal is applied to the second input terminal of each of the six AND gates 14a through 14f.

The output of the CR oscillator circuit 1 is applied to a variable frequency divider circuit 16 for correcting an error in the product of the values of the reference resistance $R_o$ and capacitance C of the thermister and time constant capacitor, respectively, contained in the CR oscillator circuit. The variable frequency divider circuit 16 constitutes a five-bit rate multiplier 121 and a frequency divider whose division ratio is 82, connected in series, and has three adjustment terminals 16a, 16b, 16c to which logic level signals are applied. By selecting these logic levels in an appropriate manner, any of eight different output frequencies can be obtained through multiplying the input frequency by $31/32\times82$, $30/32\times82$, $29/32\times82$, $28/32\times82$, $27/32\times82$, $26/32\times82$, $25/32\times82$ or $24/32\times82$. Taking an output frequency of $28/32\times82$ as the designed center value, the range over which the error in the time constant $CR_o$ can be corrected will be 16% to −12.5%, and the combined error will be about ±1.8%.

The output signal of 32.768 kilohertz from the crystal-controlled oscillator 17 is used directly as the clock C1 constituting the time base signal.

A temperature compensation operation for maintaining the timekeeping accuracy of the timepiece takes place in the following manner. The timing signal generating circuit 15 generates the series of timing control signals C, 1, S2 and S3, shown in FIG. 15, whereby the CR oscillator circuit 1 produces a signal having a period which is an exponential function of temperature, the period of the signal being corrected by the variable frequency divider circuit 16 and converted into the logarithmic period L by the logarithmic period transformation circuit 12. The logarithmic period L is used to address the read-only memory 13, which responds by delivering the temperature compensation data designated by the address, that is, by the result of the logarithmic transformation. This output data D(T) is composed of the bits D1 through D6. Bit D1 is a signal which controls whether the number of clock pulses which enter the flip-flop FF1 are increased by one pulse per minute and, likewise, the bits D2, D3, D4, D5, D6 are signals for controlling whether the clock pulses which enter the corresponding flip-flops FF2, FF3, FF4, FF5, FF6 are increased by one pulse per minute. Since the clock pulses which enter the flip-flops FF1 through FF6 possess weights which are once, twice, four times, eight times, 16 times and 32 times those of the pulses generated by the crystal-controlled oscillator circuit 17, the output data D(T) of the read-only memory 13 can be thought of as numerical data which instructs the frequency divider circuit 18 on how many extra pulses from the crystal-controlled oscillator 17 are to be added to the output frequency of the divider circuit in one minute. This numerical data causes the addition operation to take place by directly setting the frequency divider circuit 18 through the six AND gates 14a through 14f when the adjustment timing signal S4 is generated, the latter occurring once per minute. This technique is equivalent to raising the oscillation frequency of the crystal-controlled oscillator circuit 17, wherein the average increase in frequency is D(T)/60 Hz, using the output data D(T) of the read-only memory 13.

Since the standard oscillation frequency of the crystal-controlled oscillator circuit 17 is 32768 hertz, the frequency correction factor E (PPM) is given by the following:

$$E=[D(T)/32768\times60]\times10^6\div0.51\times D(T) \quad (PPM) \tag{26}$$

For a case where a tuning fork-type crystal vibrator which operates in the region of 32 kilohertz is employed, Eq. (27) shown below gives the temperature characteristic of the frequency of the crystal-controlled oscillator circuit 17. Here, $\Delta f_o$ (Hz) denotes the error term dependent upon the temperature T (K) of the oscillation frequency of the crystal-controlled oscillator circuit 17; it is adjusted to be zero at room temperature, i.e., 296 (K).

$$\Delta f_o = -a(T-296)^2 \; (Hz) \tag{27}$$

In Eq. (27), a is a constant, having a value of about 1100, referred to as the secondary temperature coefficient. In order to diminish $\Delta f_o$ to zero in Eq. (17), $\Delta f_o$ should satisfy the following:

$$E\times 38768 = \Delta f_o \tag{28}$$

We therefore obtain the following equation:

$$D(T) = a(T-296)^2/(0.51\times 32768) \tag{29}$$

$$= 0.066(T-296)^2$$

The output data D(T) from the read-only memory 13 is a binary representation of the numerical value obtained by substituting the temperature T into Eq. (29), where T corresponds to the numerical value of the logarithmic period L serving as the address input to the read-only memory. Table VI shows output data D(T) and frequency correction factor E for a case where the address input to the read-only memory 13 is determined by the conversion graph of FIG. 18. It will be appreciated from the Table that the temperature-induced error takes on a large value, exceeding the limits of the temperature compensation, at temperatures below −8° C. and above +54° C.

TABLE VI

| Temperature | | ROM input | ROM output D (T) | | | | | | Correction Factor |
|---|---|---|---|---|---|---|---|---|---|
| °C. | °K. | L | D6 | D5 | D4 | D3 | D2 | D1 | E (PPM) |
| −20 | 253 | 126 | 1 | 1 | 1 | 1 | 1 | 1 | +32 |
| −10 | 263 | 118 | 1 | 1 | 1 | 1 | 1 | 1 | +32 |
| −8 | 265 | 115 | 1 | 1 | 1 | 1 | 1 | 1 | +32 |
| 0 | 273 | 99 | 1 | 0 | 0 | 0 | 1 | 1 | +17.85 |
| 10 | 283 | 75 | 0 | 0 | 1 | 0 | 1 | 1 | +5.61 |
| 20 | 293 | 54 | 0 | 0 | 0 | 0 | 0 | 1 | +0.51 |
| 23 | 296 | 48 | 0 | 0 | 0 | 0 | 0 | 0 | 0 |
| 30 | 303 | 38 | 0 | 0 | 0 | 0 | 1 | 1 | +1.53 |
| 40 | 313 | 26 | 0 | 1 | 0 | 0 | 1 | 1 | +9.69 |
| 50 | 323 | 18 | 1 | 1 | 0 | 0 | 0 | 0 | +24.48 |
| 54 | 327 | 16 | 1 | 1 | 1 | 1 | 1 | 1 | +32 |
| 60 | 333 | 13 | 1 | 1 | 1 | 1 | 1 | 1 | +32 |
| 70 | 343 | 9 | 1 | 1 | 1 | 1 | 1 | 1 | +32 |

In connection with the operation of the circuit shown in FIG. 19, the adjustment for timekeeping accuracy is performed instantaneously once every minute, so that it is unnecessary to preserve the adjustment data continuously. Accordingly, the latch circuit 12k shown in the logarithmic period transformation circuit of FIG. 14 can be dispensed with, and the latch signal S3 can be used instead as the adjustment timing signal S4. The same is true when the temperature compensating system is employed to temperature-compensate the display density of an electrochromic display, referred to as an ECD. This is because the ECD display density is influenced by temperature only during the fixed periods in which the display is changed. Accordingly, the temperature compensation data is unnecessary, and therefore need not be preserved, when no change in the display is effected. In many applications, however, the temperature compensation data must be constantly available. In such cases the arrangement of FIG. 14 may be adopted.

In accordance with the present invention as described and illustrated hereinabove, an electronic device can be subjected to temperature compensation very easily and inexpensively. Specifically, the invention does away with a complicated sensitivity adjustment which, until now, has been required because the temperature sensitivity of a thermistor, employed as a temperature sensor, is dependent upon the characteristics of the thermistor. Since a variation in thermistor resistance is converted into the varying period of a signal by means of the CR oscillator circuit, analog-to-digital conversion is greatly facilitated, and any error in the thermistor resistance also can be corrected through digital processing. Transforming the frequency or period of the output information from the CR oscillator circuit into a logarithm by the transformation circuit diminishes the number of effective digits, so that great economy is achieved in terms of the capacity of the read-only memory. It is possible to obtain numerical data in the form of a linear expression approximately proportional to ambient temperature, and the read-only memory can be programmed for any function of temperature directly required for the temperature compensation, regardless of how complex the function may be. Thus it may be appreciated that the invention solves various technical problems heretofore encountered in the art.

In connection with the system of the type shown in FIGS. 10 and 19, all components with the exception of the thermistor and crystal vibrator can be realized by integrated circuit techniques, so that the circuit lends itself well to mass production and can therefore be acquired at very low cost.

The temperature measuring system of the present invention applicable not only to temperature-compensating timekeeping accuracy in electronic timepieces or display density in ECD devices, but may also be applied to compensate temperature in matrix-driven liquid crystal display devices and in such sensors as strain gauges, phototransistors and Hall devices. The invention also finds use in a variety of thermometers, such as climatic and clinical thermometers.

As many apparently widely different embodiments of the present invention may be made without departing from the spirit and scope thereof, if it to be understood that the invention is not limited to the specific embodiments thereof except as defined in the appended claims.

What is claimed is:

1. A temperature measurement system comprising:

a capacitance-resistance oscillator circuit having a time constant circuit including at least one thermistor functioning as a resistive element, for producing an output signal at a frequency which varies with ambient temperature in a manner determined by a temperature coefficient of said thermistor;

control circuit means coupled to receive said oscillator circuit output signal, and responsive thereto for periodically producing groups of pulses, with the number of pulses in each of said groups varying in a manner determined by the value of said oscillator circuit output signal frequency during generation of said group; and a logarithmic transformation circuit coupled to receive said groups of pulses from said control circuit means, and responsive to each of successive ones of said groups for producing digital data representing a numeral which is the logarithm of the number of pulses in said group, whereby said digital data varies in accordance with ambient temperature in a substantially linear manner within a limited range of temperatures.

2. A temperature measurement system according to claim 1, and further comprising a read-only memory circuit storing specific temperature function data, coupled to receive said digital data and responsive thereto for producing as output a portion of said specific temperature function data corresponding to an ambient temperature represented by said digital data.

3. A temperature measurement system according to claim 1, in which the number of pulses in each of said groups varies in direct proportion to the frequency of said oscillator output signal, whereby said digital data varies substantially in direct proportion to ambient temperature.

4. A temperature measurement system according to claim 1, in which said control circuit means comprise: gate circuit means for periodically transferring said oscillator output signal to said logarithmic transformation circuit during each of successively occurring time intervals of fixed duration, whereby an output signal thereby produced from said gate circuit means comprises said groups of pulses to be input to said logarithmic transformation circuit.

5. A temperature measurement system according to claim 1, in which the number of pulses in each of said groups varies in proportion to the period of said oscillator output signal, whereby said digital data varies substantially in inverse proportion to ambient temperature.

6. A temperature measurement system according to claim 5, in which said control circuit means comprise:

counter circuit means periodically enabled to count a fixed number of periods of said oscillator circuit output signal, for producing a control signal while said counting is in progress; and a source of a pulse train at a fixed frequency and gate circuit means controlled by said control signal for transferring pulses of said pulse train to an output thereof for the duration of each interval in which said fixed number of periods of said oscillator circuit output signal is being counted;

said groups of pulses being thereby respectively output from said gate circuit means during said count intervals.

7. A temperature measurement system according to claim 1, and further comprising a frequency divider circuit having an adjustable frequency division ratio, coupled between said oscillator circuit output and said control circuit means 8. A temperature measurement system according to claim 1, in which said logarithmic transformation circuit comprises:
- a rate multiplier circuit coupled to receive said groups of pulses from said control circuit means and having a plurality of rate input terminals responsive to signals applied thereto for controlling said rate multiplier circuit to produce a group of output pulses containing a mathematically determined number of pulses in response to each of said groups of pulses input thereto;
- a frequency divider circuit for performing frequency division of said groups of output pulses, and;
- a counter circuit for counting output pulses from said frequency divider circuit and producing output signals indicative of the count value attained, and a plurality of inverters coupled to respectively invert said output signals from said counter circuit and apply said inverted output signals to said rate input terminals of said rate multiplier circuit;
- said counter circuit output signals constituting said digital data produced by said logarithmic transformation circuit.

9. A temperature measurement system according to claim 1, further comprising latch circuit means coupled to receive said digital data produced by said logarithmic transformation circuit, for storing said data during intervals between generation of said groups of pulses.

* * * * *